United States
Shaw

4,066,482
Jan. 3, 1978

[54] SELECTIVE EPITAXIAL GROWTH TECHNIQUE FOR FABRICATING WAVEGUIDES FOR INTEGRATED OPTICS

[75] Inventor: Don W. Shaw, Dallas, Tex.

[73] Assignee: Texas Instruments Incorporated, Dallas, Tex.

[21] Appl. No.: 673,025

[22] Filed: Apr. 2, 1976

Related U.S. Application Data

[62] Division of Ser. No. 458,628, April 8, 1974, Pat. No. 3,984,173.

[51] Int. Cl.$^2$ .................. H01L 21/20; H01L 29/06
[52] U.S. Cl. .................................. 148/175; 156/612; 357/18; 350/96 WG
[58] Field of Search .................. 148/175; 156/612; 357/18; 350/96 WG

[56] References Cited

U.S. PATENT DOCUMENTS

| | | | |
|---|---|---|---|
| 3,206,339 | 9/1965 | Thornton | 148/175 |
| 3,409,483 | 11/1968 | Watson | 148/175 |
| 3,425,879 | 2/1969 | Shaw et al. | 148/175 |
| 3,461,003 | 8/1969 | Jackson | 148/175 |
| 3,537,020 | 10/1970 | Anderson | 350/96 WG X |
| 3,563,630 | 2/1971 | Anderson et al. | 350/96 WG |
| 3,586,925 | 6/1971 | Collard | 148/175 X |
| 3,790,902 | 2/1974 | Miller | 350/96 WG X |
| 3,833,435 | 9/1974 | Logan et al. | 350/96 WG X |
| 3,884,733 | 5/1975 | Bean | 148/175 |
| 3,902,133 | 8/1975 | Watts | 357/18 X |

OTHER PUBLICATIONS

Shaw, D. W., "Selective Epitaxial Deposition of Gallium Arsenide in Holes" J. Electrochem. Soc., vol. 113, No. 9, Sept. 1966, pp. 904–908.
Isibashi et al., "Anisotropy in Etching and Deposition of ...... GaAs" Japan, J. Appl., Phys., vol. 9, (1970), pp. 1007–1008.
IIDA et al., "Morphological Studies on Selective Growth of GaAs" Journal of Crystal Growth, vol. 13/14, (1973), pp. 336–341.

*Primary Examiner*—L. Dewayne Rutledge
*Assistant Examiner*—W. G. Saba
*Attorney, Agent, or Firm*—James T. Comfort; Gary C. Honeycutt

[57] ABSTRACT

This disclosure concerns optical waveguides of semiconductor material through which light is adapted to be propagated. The optical waveguides comprise respective first and second layers of semiconductor material of the same conductivity type, wherein one of the semiconductor layers has a relatively low refractive index, while the other semiconductor layer has a relatively high refractive index, with the light being adapted to be propagated through the semiconductor layer having the relatively high refractive index. The optical waveguide structures are characterized by having the semiconductor layer through which the light is to be propagated so formed as to include each of its two side surfaces and top surface as being planar faceted growth surfaces of extreme smoothness to avoid scattering light as it is being propagated therethrough, thereby minimizing losses. In a particular aspect, an optical waveguide is provided in which each of its four planar surfaces including top, bottom, and side surfaces is formed as a smooth planar faceted growth surface, the optical waveguide comprising a second epitaxial deposit having a relatively high refractive index disposed atop a first epitaxial deposit in co-extensive relationship therewith, wherein the first epitaxial deposit is of the same conductivity type having a lower refractive index and being so formed on a substrate as to include its side surfaces and top surface as smooth planar faceted growth surfaces.

3 Claims, 6 Drawing Figures

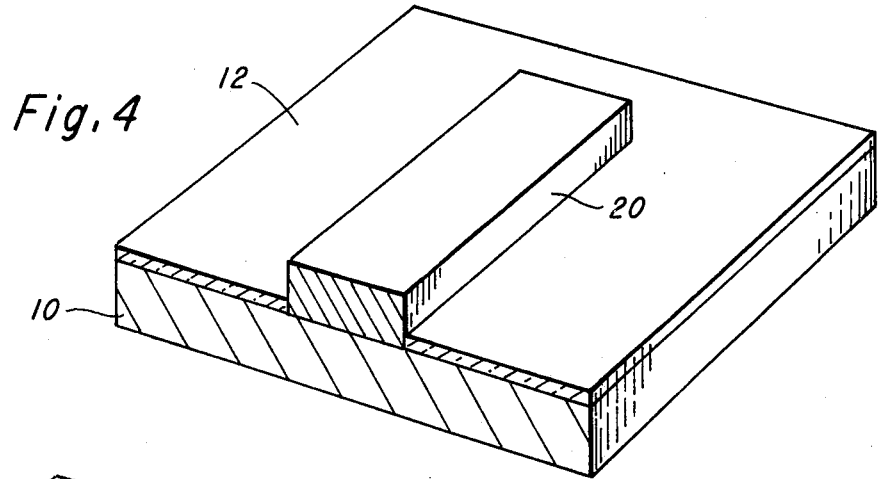
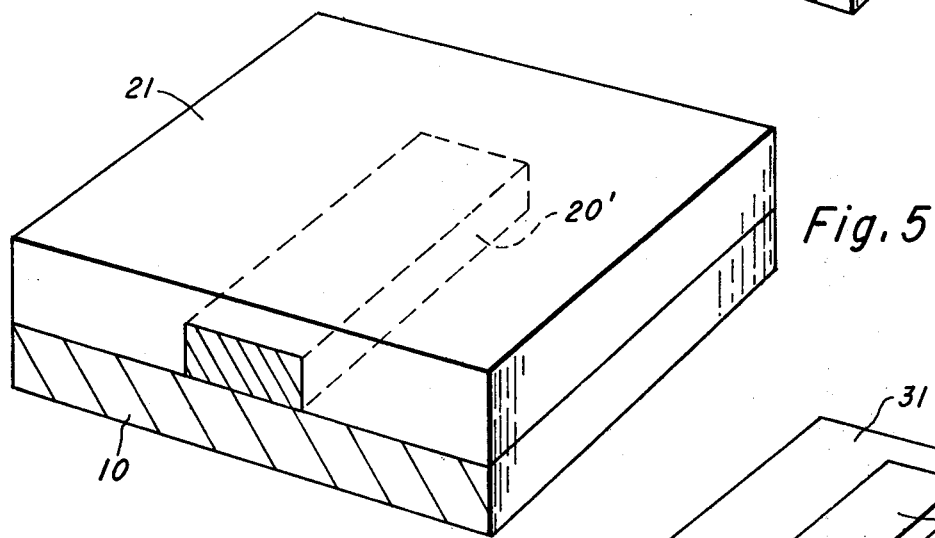
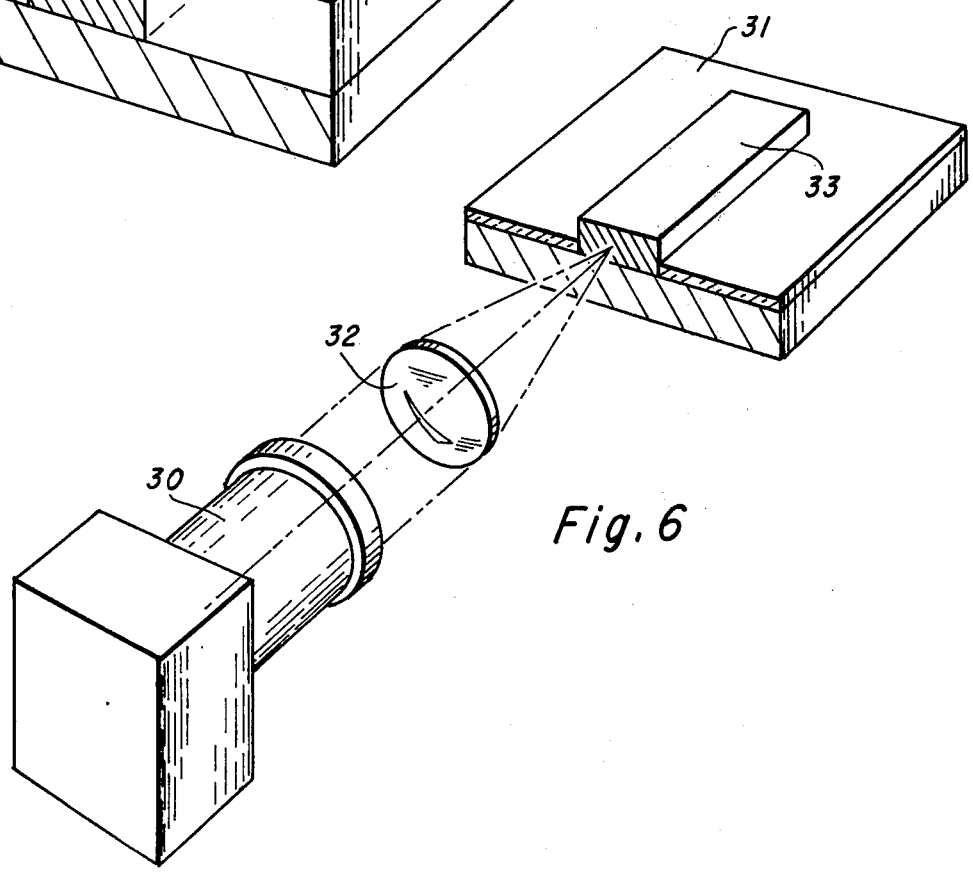

SELECTIVE EPITAXIAL GROWTH TECHNIQUE FOR FABRICATING WAVEGUIDES FOR INTEGRATED OPTICS

This is a division of application Ser. No. 458,628, filed Apr. 8, 1974, now issued U.S. Pat. No. 3,984,173, issued Oct. 5, 1976.

This invention relates to an optical waveguide of semiconductor material having general applicability to integrated optics in order to transmit light propagated through the waveguide without substantial loss. More particularly, the present invention is directed to an optical waveguide of semiconductor material including first and second semiconductor layers having differing refractive indices, wherein the two semiconductor layers are disposed in contiguous opposed relationship such that the semiconductor layer having the higher index of refraction is provided with a planar faceted growth surface of extreme smoothness at least on its two side surfaces and top surface.

As improved optical sources and associated devices have been and continue to be developed, the feasibility of optical data processing systems is becoming an acceptable premise. In this connection, the integration of optical devices in a manner similar to the well known integrated circuit may enable multiple data processing functions to be performed on a small area of material, provided the necessary miniaturization of the optical components and integration of the separate functions can be achieved. In general, integrated optics would include, for example, a source for light generation, propagation, modulation and directional coupling, wherein all of these functions are integrated so as to take place on a single substrate. Integrated optics as herein described is more fully disclosed in co-pending U.S. application, Ser. No. 443,469, filed Jan. 18, 1974.

Now abandoned, continuation application, Ser. No. 575,862, filed May 9, 1975, now U.S. Pat. No. 4,007,978, issued Feb. 15, 1977, divisional application Ser. No. 695,229, filed June 11, 1976 and divisional application Ser. No. 695,237, filed June 11, 1976.

One of the optical devices disclosed in the aforesaid co-pending U.S. application is an optical waveguide structure comprising first and second chalcogenide glasses with differing indices of refraction, wherein light is propagated through the layer of chalcogenide glass having the higher index of refraction. Light scattering is a recurring problem with such optical waveguides and is responsible for substantial light losses, thereby detracting from the effectiveness of such optical waveguides. The aforesaid U.S. application further describes optical waveguides utilizing first and second semiconductor layers having different indices of refraction and substantially transparent to light. Here again light scattering is a problem even though the exposed surfaces of such semiconductor layers in the optical waveguide therein described appear very smooth to the naked eye. In this connection, the epitaxial growth of semiconductor material on a substrate, although appearing to provide an extremely smooth top surface will be found to exhibit so-called "growth steps" when examined with an interference contrast microscope. An explanation of the physical phenomenon occuring during the growth of large area epitaxial deposits appears in the article, "Selective Epitaxial Deposition of Gallium Arsenide in Holes" by Don W. Shaw, published in the *Journal of the Electrochemical Society*, Vol. 113, No. 9 (Sept. 1966), pages 904–908.

In accordance with the present invention, it is proposed to provide optical waveguide structures through which light may be propagated, wherein such optical waveguide structures are formed with well-defined geometries and with extremely smooth exposed surfaces to minimize light scattering. This is accomplished in the present instance by providing an optical waveguide of semiconductor material including first and second semiconductor layers having different indices of refraction, wherein the semiconductor layer having the higher index of refraction is so constructed as to include each of its two side surfaces and its top surface as planar faceted growth surfaces of extreme smoothness as contrasted to the exposed surfaces of optical waveguides heretofore known. The improved optical waveguide of semiconductor material is constructed by providing for selected area epitaxial growth of the semiconductor layer which is to form the substantially transparent waveguide through which light may be propagated. By confining epitaxial growth to a properly defined area, it is possible to form an epitaxial semiconductor layer with a well-defined rectangular cross-section having planar side surfaces and a top surface which comprise faceted growth surfaces of extreme smoothness and free from the step configuration described in the previously mentioned publication. In this connection, the invention takes advantage of differences in growth rate of various crystalline facets, as disclosed in my previous U.S. Pat. No. 3,425,879 issued Feb. 4, 1969 so as to form an optical waveguide of semiconductor material offering improved operating performance in the controlled propagation of light along a predetermined path.

The present invention is embodied in a number of different structural aspects, one of which comprises a semiconductor layer substantially transparent to light and being epitaxially formed on a semiconductor substrate of the same conductivity type as a raised elongated continuous layer. The epitaxial semiconductor layer is lightly doped as contrasted to the semiconductor substrate so as to present a relatively low free carrier concentration with correspondingly high resistivity as compared to the relatively high free carrier concentration and correspondingly low resistivity of the semiconductor substrate, with the elongated raised semiconductor layer being formed in accordance with the procedure discussed in the aforesaid U.S. Pat. No. 3,425,879 to present planar faceted growth surfaces of extreme smoothness for each of the two side surfaces and the top surface thereof.

In another aspect, the optical waveguide of semiconductor material previously described may be modified by adding a body of material having essentially the same refractive index as the substrate so as to embed the elongated raised semiconductor layer epitaxially formed on the substrate with an encapsulating body of material.

In yet another aspect of the invention, the raised elongated epitaxial layer may be formed with the same refractive index as that of the substrate, and a second epitaxial layer is then formed atop the first epitaxial layer in continuous registering relationship therewith, such that the optical waveguide so produced utilizes the second epitaxial layer as the light propagation path, wherein the second epitaxial layer is comprised of top, bottom, and both side surfaces formed as smooth faceted growth planar surfaces.

Having described the invention generally, other features of the invention will be more fully understood from the following more detailed description as set forth in the specification when taken together with the accompanying drawings in which:

FIG. 4 is a perspective view of another embodiment of an optical waveguide constructed in accordance with the present invention;

FIG. 5 is a perspective view of yet another embodiment of an optical waveguide constructed in accordance with the present invention; and FIG. 6 is a perspective view of an optical system in which an optical waveguide of the type illustrated in FIG. 4 is employed.

Figure 1:
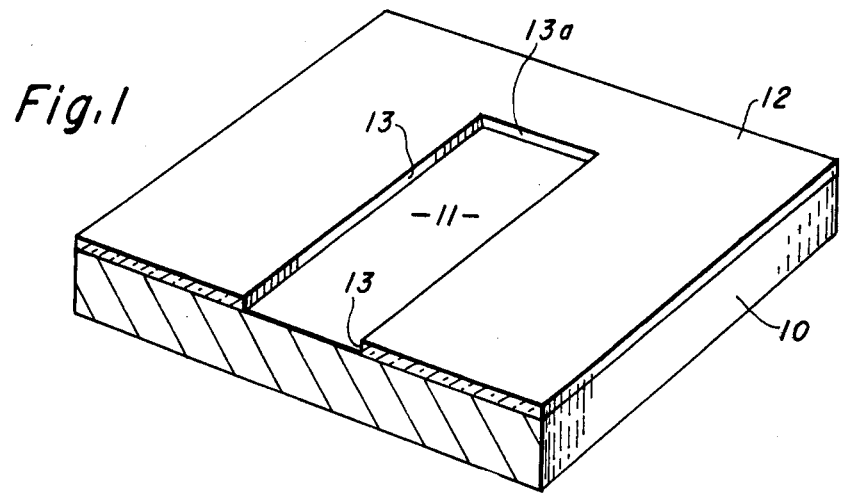
FIG. 1 is a perspective view showing a semiconductor substrate provided with a patterned mask on one surface thereof in the fabrication of an optical waveguide of semiconductor material in accordance with the present invention.

Referring more specifically to the drawings, various embodiments of an optical waveguide constructed in accordance with the present invention are illustrated therein. It will be understood that this invention requires the formation of such semiconductor waveguides as epitaxial deposits so as to form at least the two side surfaces and top surface of the semiconductor waveguide as faceted growth planar surfaces of extreme smoothness. Semiconductor materials suitable for use with this invention include all compound semiconductor materials from the III–V Groups, gallium arsenide being a preferred material, pseudobinary compounds, such as $Ga_xIn_{1-x}As$ and $Ga_xAl_{1-x}As$, silicon, and germanium. The Group III–V compound semiconductor materials and pseudobinary compounds are particularly suitable inasmuch as these materials can be made to lase, but silicon and germanium although incapable of lasing operation may be employed as materials of the optical waveguides disclosed herein for directionally controlling light propagation.

In constructing the optical semiconductor waveguide, procedures such as those described in U.S. Pat. No. 3,425,879 are employed to produce the desired planar faceted growth surfaces on the waveguides. To this end, referring to FIG. 1, a monocrystalline semiconductor substrate 10 is shown. The substrate 10 is made of a suitable semiconductor material as described herein and is so oriented as to include a surface 11 arranged in a plane which will be parallel to a relatively fast-growing crystallographic plane of a semiconductor material to be subsequently epitaxially deposited thereon, wherein the crystal growth rate of the relatively fast-growing crystallographic plane is compared to planes of the proposed side and end walls of an epitaxial deposit to be formed. In the latter connection, the side and end walls of the epitaxial deposit will be oriented to lie in planes parallel to slow-growing crystallographic planes of the semiconductor material to be epitaxially deposited, and the plane to which the surface 11 is parallel is a relatively fast-growing crystallographic plane as compared to the slow-growing crystallographic planes planned for the side and end walls of the epitaxial deposit. However, the plane to which the surface 11 is parallel is a relatively slow-growing crystallographic plane of the semiconductor material as contrasted to immediately adjacent orientations. If the surface 11 of the substrate 10 is oriented to lie in the {100} plane, for example, the immediately adjacent orientations would include fast-growing crystallographic planes {115}, {117}, and {119} where the semiconductor material is gallium arsenide, compared to each of which the {100} plane would exhibit a relatively slow crystallographic growth rate. For example, the substrate 10 may be n-type monocrystalline gallium arsenide which is doped to produce a free carrier concentration of the order of $10^{18}/cm^3$. Suitable dopant materials for gallium arsenide to provide donar impurities include tellurium, sulfur, selenium, and silicon. When doped in this manner, the n-type gallium arsenide substrate 10 has a resistivity on the order of $2 \times 10^{-3}$ ohm-cm. The surface 11 of the n-type gallium arsenide substrate 10 is oriented to lie in the {100} plane.

Figure 2:
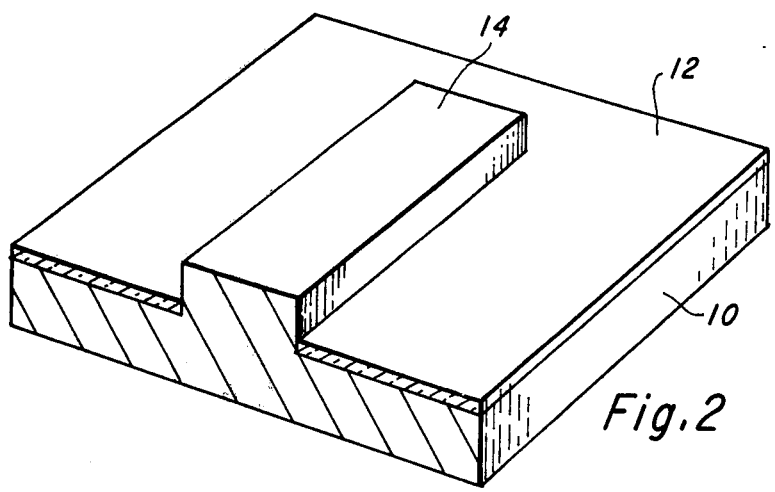
FIG. 2 is a perspective view, similar to FIG. 1, but showing the epitaxial deposition of a semiconductor layer on the exposed surface of the substrate through the patterned mask.

Initially, the surface 11 of the substrate 10 is covered with a suitable protective mask 12, such as silicon oxide. The mask 12 is then patterned by any suitable well known photolithographic technique to provide an opening or window therethrough exposing a portion of the substrate surface 11. In etching the mask 12 to provide the opening or window therethrough, the shapes of the side walls 13 of the opening formed in the mask 12 which bound the exposed area of the substrate surface 11 are oriented so as to be parallel to slow-growing crystallographic planes of the semiconductor material which is to be subsequently epitaxially deposited on the exposed substrate surface 11. In the instance where the epitaxial deposit is to be of n-type gallium arsenide, the side walls 13 bounding the opening in the mask 12 are oriented so as to be parallel to the {110} plane which is a slow-growing crystallographic plane for gallium arsenide epitaxial deposition. The end wall or walls 13a is also oriented so as to be parallel to the {110} plane. Thus, the preferred direction of epitaxial growth will occur substantially normal to the surface 11 of the substrate 10 as an elongated raised strip of epitaxial material 14, as illustrated in FIG. 2. In this connection, the side walls 13 and the end wall 13a of the mask 12 bounding the opening therein through which the portion of the substrate surface 11 is exposed are effective to confine the epitaxial growth of the elongated raised epitaxial strip 14 substantially to a growth direction normal to the plane of the substrate surface 11, inasmuch as the sides and ends of the epitaxial strip 14 will be arranged parallel to slow-growing crystallographic planes of the semiconductor material being epitaxially deposited. Therefore, the deposition of the epitaxial strip 14 occurs in a substantially vertical direction without spreading over the mask 12. Epitaxial deposit of the n-type gallium arsenide forming the raised elongated strip 14 may be continued until the epitaxial deposit has a thickness of the order of two microns covering the area of the substrate surface 11 exposed by the opening in the mask 12, the epitaxial deposition taking place under gas phase composition such that the {110} plane will have a relatively low epitaxial growth rate as compared with immediately adjacent orientations and also with respect to the {100} plane associated with the surface 11. Such an arrangement produces {110} plane faceted growth, and the resulting elongated raised epitaxial strip 14 has opposite sides and ends with surfaces formed as {110} plane facets. The top surface of the elongated raised epitaxial strip 14 is formed as a {100} plane facet, such that the resulting elongated raised epitaxial strip 14 has each of its exposed surfaces including the two side surfaces, the end surfaces, and the top surface formed as a smooth faceted growth planar surface.

Figure 3:
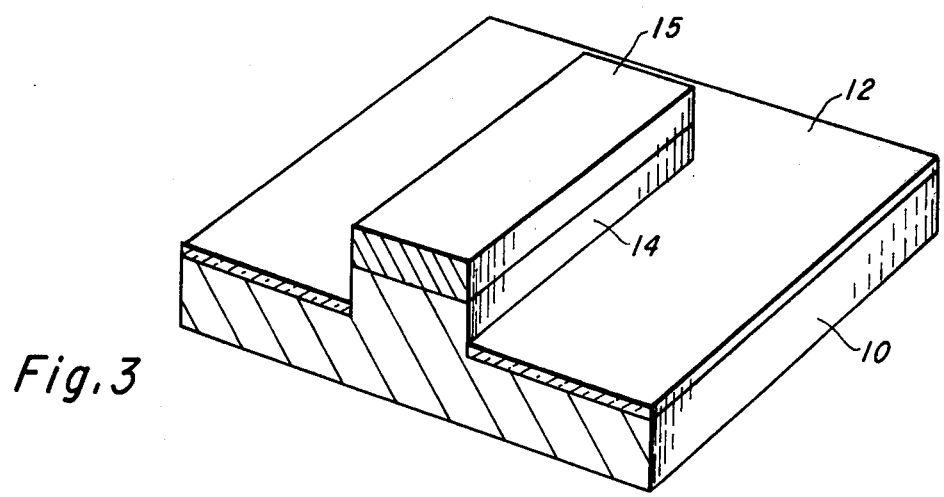
FIG. 3 is a perspective view showing the final state in the fabrication of an optical waveguide in accordance with the present invention.

In the embodiment of the invention illustrated in FIGS. 1–3, the elongated raised epitaxial strip 14 is deposited to have the same dopant level as the substrate 10 on which it is formed, thereby having a free carrier concentration of the order of $10^{18}/cm^3$, wherein the dopant material is selected from the group of tellurium, sulfur, selenium, and silicon as previously described. Therefore, the resistivity of the elongated raised epitaxial strip 14 is of the order of $2 \times 10^{-3}$ ohm-cm.

After formation of the first epitaxial layer comprising the elongated raised strip 14, a second protective mask (not shown) is laid down on the substrate surface in the same position as the first mask 12 and to a thickness wherein the second mask covers the top surface of the elongated raised epitaxial strip 14. In this respect, the first mask 12 may be removed or may remain in place prior to the formation of the second mask. Where the first mask 12 remains in place, the second mask is laid down atop the first mask in contiguous covering relationship with respect thereto. The second mask is then patterned in the same manner as the first mask 12 by a suitable photolithographic technique to provide an opening or window therethrough exposing the top surface of the raised epitaxial strip 14. The shapes of the sidewalls and end wall or walls of the opening formed in the second mask which bound the exposed top surface of the raised epitaxial strip 14 are oriented so as to be parallel to slow-growing crystallographic planes of the semiconductor material which is to be subsequently epitaxially deposited onto the exposed top surface of the elongated raised epitaxial strip 14. This procedure is identical to that previously described in connection with FIG. 1. Thus, where the second epitaxial deposit is to be of n-type gallium arsenide, the side walls and end wall or walls bounding the opening in the second mask are oriented so as to be parallel to the {110} plane which is a slow-growing crystallographic plane for gallium arsenide epitaxial deposition.

In order to form an optical waveguide, the second epitaxial layer when formed atop the raised epitaxial strip 14 must have a different refractive index, it being preferred that the second epitaxial layer be provided with a lower dopant level than the first epitaxial layer so as to have a high refractive index with respect thereto such that the second epitaxial layer will serve as the layer through which light is propagated in the use of the optical waveguide. To this end, the second epitaxial layer may be n-type gallium arsenide deposited to a thickness of the order of two microns so as to cover the top surface of the raised epitaxial strip 14 under a gas phase composition such that the {110} plane will have a relatively slow growth rate as compared with immediately adjacent orientations to produce side surfaces and end surfaces for the second epitaxial layer 15 formed by {110} plane faceted growth in substantially flush relationship with the side surfaces and end surface of the raised epitaxial strip 14 therebeneath. The second epitaxial layer 15 is deposited employing a dopant level to produce a free carrier concentration therein of the order of $10^{16}/cm^3$, using the same donor dopant materials previously described. As so deposited, the second epitaxial layer 15 has a resistivity on the order of $2 \times 10^{-1}$ ohm-cm. Since the second epitaxial layer 15 is deposited onto the top surface of the first epitaxial layer comprising the elongated strip 14, the bottom surface of the second epitaxial layer 15 will be faceted growth surface in the {100} plane, as will the top surface of the second epitaxial layer 15. Therefore, the second epitaxial layer 15 will be formed as an elongated strip of epitaxial material contiguous to the first epitaxial layer 14 and having a rectangular cross-section with each of its four surfaces being formed as planar faceted growth surfaces of extreme smoothness. In the completed optical waveguide illustrated in FIG. 3, the second epitaxial layer or upper epitaxial layer 15 having a relatively high refractive index as compared to that of the first epitaxial layer or lower epitaxial layer 14 defines a light propagating path along which light may be transmitted.

FIG. 4 illustrates an alternative embodiment of the optical waveguide, wherein only a single epitaxial semiconductor layer 20 is formed on the substrate 10. FIG. 4 is similar to an intermediate state in the development of the first embodiment illustrated in FIG. 2, but differs therefrom in that the elongated raised strip of epitaxial material 20 is deposited under such conditions of gas phase composition and dopant level to produce an elongated raised strip of epitaxial material 20 having a lower dopant level and a higher refractive index as compared to the substrate 10 on which it is deposited. The deposition of the elongated raised strip of epitaxial material 20 is carried out under the same conditions described in connection with the embodiment of FIGS. 1–3 in that the epitaxial growth of the side surfaces and end surfaces thereof is confined by orienting the side walls and end wall or walls of the opening formed in the mask 10 to lie in planes parallel to slow-growing crystallographic planes of the semiconductor material which is to be epitaxially deposited on the substrate 10. The completed optical waveguide of FIG. 4 utilizes the single elongated raised epitaxial strip 20 as the medium through which light is to be propagated, the epitaxial strip 20 having a higher refractive index as compared to that of the substrate 10 on which it is disposed.

Another embodiment is illustrated in FIG. 5, this embodiment being similar to that of FIG. 4 in that only a single elongated epitaxial strip 20' is required. However, the single epitaxial strip 20' of the embodiment of FIG. 5 is wholly confined by means of the substrate 10 on which it is disposed and an encapsulating body 21 which is formed to have substantially the same index of refraction as that of the substrate 10. Prior to the formation of the encapsulating body 21, the patterned mask (not shown) is removed from the substrate 10 in the embodiment of FIG. 5, and the encapsulating body 21 is then epitaxially deposited on the substrate 10 and the single elongated epitaxial strip 20' to a thickness completely embedding the single epitaxial strip 20' except for the end surfaces thereof which are exposed in order that light may be introduced thereinto at one end, transmitted through the single epitaxial strip 20' and emitted at the opposite end thereof. The epitaxial deposit of the encapsulating body 21 will normally cause a slight hump configuration to be formed as the top surface of the encapsulating body 21 overlying the embedded epitaxial strip 20' and in spaced relation thereto. The hump is removed by a suitable mechanical technique, such as grinding and polishing, or a chemical technique, such as controlled etching, to provide a planar top surface for the encapsulating body 21 as illustrated.

Preferably, the transverse cross-sections of the epitaxial strips of semiconductor material included in the optical waveguides constructed in accordance with the present invention are rectangular. However, the slow crystallographic growth of the side surfaces of an epitaxial strip of semiconductor material may proceed in such a manner as to impart a trapezoidal transverse cross-section to the strip, wherein the side surfaces although formed as smooth faceted growth planar surfaces are disposed at slight angles from a perpendicular relation to the top and bottom surfaces of the strip.

FIG. 6 schematically illustrates the use of an optical waveguide as constructed in accordance with the present invention in a data processing system employing light signals. To this end, the system illustrated in FIG. 6 includes a light source 30, an optical waveguide 31 which for illustrative purposes is the same as the embodiment shown in FIG. 4, and a focusing lens 32. The lens 32 is interposed between the light source 30 and the optical waveguide 31 so as to focus the beam of light emitted from the light source 30 onto an end surface of the raised elongated epitaxial strip 33. The light so focused by the lens 32 is adapted to be propagated through the length of the raised elongated epitaxial strip 33 and to be emitted from the output end thereof.

While the optical waveguides according to this invention have been described in relation to the formation of special epitaxial deposits on substrate material or on another epitaxial deposit, wherein the materials employed are the same semiconductor materials, it is within the spirit of this invention to provide an optical waveguide in which the epitaxial deposit forming the elongated continuous epitaxial strip through which the light is adapted to be propagated may be made of a different semiconductor material. In the latter connection, it is necessary that the crystalline lattice configuration of the semiconductor material comprising the elongated epitaxial strip substantially match that of the substrate or other epitaxial deposit on which it is disposed in order to promote proper epitaxial growth resulting in the desired smooth faceted growth planar surfaces for the elongated epitaxial strip which is adapted to transmit light therethrough.

While particular embodiments of this invention have been disclosed herein, it will be understood that various modifications may become apparent to those skilled in the art without departing from the spirit and scope of the invention which is defined by the appended claims.

I claim:

1. A method of making an optical waveguide of semiconductor material comprising the steps of:

forming a first mask on a surface of a monocrystalline semiconductor substrate of one conductivity type, wherein said surface is parallel to a relatively fast growing crystallographic plane of semiconductor material to be epitaxially deposited on said monocrystalline semiconductor substrate, patterning said first mask to remove a portion thereof providing an opening through the mask exposing an elongated area of said surface, wherein the opposite side walls of the opening formed in the first mask by the removal of the masked portion and bounding the exposed surface area of said substrate are arranged parallel to relatively slow growing crystallographic planes of semiconductor material to be epitaxially deposited on said semiconductor substrate as compared to relatively fast growing crystallographic planes of said semiconductor substrate, epitaxially depositing a first semiconductor material of said one conductivity type on the exposed surface area of said semiconductor substrate in said relatively fast growing crystallographic plane to provide a first continuous raised elongated epitaxially semiconductor layer having smooth planar faceted growth side surfaces confined by the opposite sidewalls of the opening in the mask which are in relatively slow growing crystallographic planes and a smooth planar faceted growth top surface which is in a relatively fast growing crystallographic plane, said first semiconductive material having a free carrier concentration, resistivity, and refractive index substantially the same as said semiconductor substrate, forming a second mask on said substrate surface in the same position as said first mask and to a thickness wherein said second mask covers the top surface of said first epitaxial semiconductor layer, patterning said second mask to remove a portion thereof providing an opening through the mask exposing the top surface of said first continuous epitaxial semiconductor layer, wherein the opposite sidewalls of the opening formed in said second mask and bounding the exposed top surface of said first continuous epitaxial semiconductor layer are arranged parallel to said relatively slow growing crystallographic planes of semiconductor material to be epitaxially deposited on the top surface of said first continuous epitaxial semiconductor layer, and epitaxially depositing a second semiconductor material of said one conductivity type on the exposed top surface of said first continuous epitaxial semiconductor layer in a said relatively fast growing crystallographic plane to provide a second continuous elongated epitaxial semiconductor layer which has each of its surface including top, bottom, and side surfaces formed as a smooth planar faceted growth surface, said second semiconductor material having a relatively low free carrier concentration and correspondingly high resistivity as compared to a relatively high free carrier concentration and correspondingly low resistivity of said first semiconductor material.

2. A method of making an optical waveguide of semiconductor material comprising the steps of:

forming a first mask on a surface of a monocrystalline semiconductor substrate of one conductivity type, wherein said surface is parallel to a relatively fast growing crystallographic plane of semiconductor material to be epitaxially deposited on said monocrystalline semiconductor substrate, patterning said first mask to remove a portion thereof providing an opening through the mask exposing an elongated area of said surface, wherein the opposite sidewalls of the opening formed in the first mask by the removal of the masked portion and bounding the exposed surface area of said substrate are arranged parallel to relatively slow growing crystallographic planes of semiconductor material to be epitaxially deposited on said semiconductor substrate as compared to relatively fast growing crystallographic planes of said semiconductor substrate, epitaxially depositing a semiconductor material of said one conductivity type on the exposed surface area of said semiconductor substrate in said relatively fast growing crystallographic plane to provide a continuous raised elongated epitaxial semiconductor layer having smooth planar faceted growth side surfaces confined by the opposite sidewalls of the opening in the mask which are in relatively slow growing crystallographic planes and a smooth planar faceted growth top surface which is in a relatively fast growing crystallographic plane, said semiconductor material being epitaxially deposited under gas phased conditions such that said raised elongated epitaxial semiconductor layer is formed with a relatively low free carrier concentration and correspondingly high resistivity as compared to a relatively high free carrier concentration in relatively low resistivity of said semiconductor substrate.

3. A method as set forth in claim 2 further including the step of epitaxially depositing a body of semiconductor material of said one conductivity type disposed on said substrate and covering said continuous raised elongated epitaxial semiconductor layer so as to encapsulate said raised elongated epitaxial semiconductor layer such that only the opposite end surfaces thereof are exposed, and said semiconductor body having a relatively low refractive index as compared to the refractive index of said raised elongated epitaxially semiconductor layer.

* * * * *